No. 736,336.  
PATENTED AUG. 11, 1903.

W. H. ROBERTS.  
PROCESS OF VULCANIZATION.  
APPLICATION FILED DEC. 8, 1902.

NO MODEL.

Witnesses.  
Marion Richards.  
Anna M. Cole.

Inventor.  
Walter H. Roberts

No. 736,336.

Patented August 11, 1903.

UNITED STATES PATENT OFFICE.

WALTER H. ROBERTS, OF PORTLAND, MAINE.

PROCESS OF VULCANIZATION.

SPECIFICATION forming part of Letters Patent No. 736,336, dated August 11, 1903.

Application filed December 8, 1902. Serial No. 134,226. (No specimens.)

*To all whom it may concern:*

Be it known that I, WALTER H. ROBERTS, a citizen of the United States, residing at Portland, in the county of Cumberland and State of Maine, have invented certain new and useful Improvements in Processes of Vulcanization; and I do hereby declare the following to be a full, clear, and exact description of the invention, such as will enable others skilled in the art to which it appertains to make and use the same.

My invention relates to a new discovery in vulcanizing india-rubber in which a greater or less amount of sulfur has been used in its preparation; and it consists, broadly, in cooking the same in a closed receptacle and at the same time applying a current of electricity thereto.

In order to graphically demonstrate the working of my new process I have illustrated the same in the accompanying drawings, in which—

Figure 1:
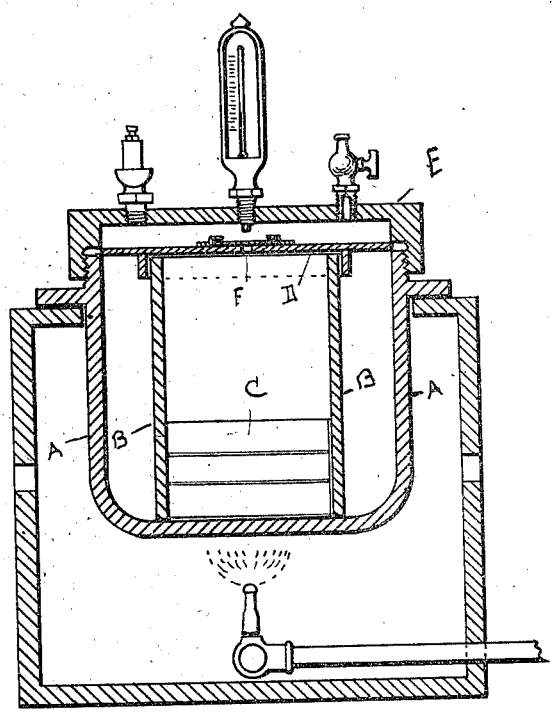
Figure 2:
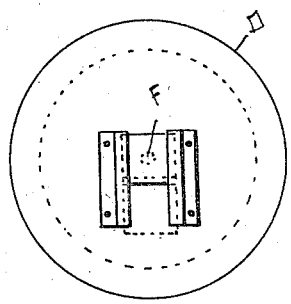

Figure 1 is a sectional view of a vulcanizer and flask, and Fig. 2 is a top plan view of the lining and cover.

Said vulcanizer consists of a copper shell A of the usual form and description used especially by dentists in the vulcanization of rubber for use in the making of dental plates or dentures. I insert within said copper vessel a strip or cylinder B of zinc, said zinc being in contact with the bottom of the copper vessel, but not necessarily in contact with the sides thereof. As is always used in processes of this kind, especially when it is desired to make artificial dentures, I use a "flask" C, so called, made of iron or any other suitable metal. In it is placed the teeth in the desired position, the spaces between said teeth being filled in with small pieces of "dental rubber," so called, and packed in very closely and tightly. The flask is of sufficient size to be in contact with the zinc and at the same time rests on the bottom of the copper vessel. I sometimes place in the bottom of the vessel a small quantity of water, although this is not absolutely necessary for the successful working of this process. I also insert in the copper vessel and over the zinc lining a cover D of zinc, said cover having a small vent F in the top thereof. I then screw down the top E of the copper receptacle tightly, so as not to allow the escape of any air or steam. Heat is then applied to the copper vessel, and the temperature therein is gradually raised to 320° Fahrenheit. By the introduction of the zinc into the copper vessel a complete voltaic battery is formed. The iron flask, placed, as it is, so as to be in contact both with the copper vessel and the zinc, forms a conductor for the current generated. This current is carried by the flask to the rubber of which the denture is composed. The heat applied to the copper vessel both accelerates and intensifies this electric action, the flask itself serving as the means whereby the current is directed from its source to the rubber denture within. The electric current thus generated and thus conducted to the denture serves as a means for aiding the action of the heat upon the dental rubber, the electric current of itself carrying no heat to the denture, but acts on the rubber in such a way that the hydrogen is more readily released from the mass. The hydrogen can be and has been in former processes released by the action of heat alone; but the presence of the electric current hastens the action because by its action on the dental rubber the hydrogen atoms are released more quickly. The time thus saved in cooking by conducting a quantity of electricity to the rubber is from thirty to forty-five minutes.

In the previous process of vulcanizing a copper vessel has been used and an iron flask placed in the bottom thereof. The contents of the flask have been prepared in the same way as in my device. Water is placed in the bottom of the copper vessel and the cover screwed down tight, so as to prevent the escape of any steam. Heat is applied and the temperature, as indicated by a suitable thermometer, is brought to 320° Fahrenheit and there maintained for from fifty to sixty minutes before the india-rubber is sufficiently vulcanized to maintain the proper rigidity and elasticity, taking in all a period of an hour and a quarter to an hour and a half.

By using my improved method, especially in cooking dentures of the usual thickness, it is only necessary to bring the heat in the copper vessel to 320° Fahrenheit and there maintain it for a short time, it being only necessary to keep the flask within the copper vessel a time not exceeding thirty minutes from the time that the heat is first applied. In cooking dentures of unusual thickness it is not necessary to bring the heat in the copper vessel to above 280° Fahrenheit; but in the cooking of both these forms of dentures the time is very materially lessened and in most cases reduced nearly one-half.

I do not wish to limit myself to the exact manner of generating the electricity as is described in this specification, for the same may be applied from the outside by means of suitable conductors running in the bottom of the copper vessel and being brought in contact with the flask, it being necessary only that when the rubber is being vulcanized the same be done in the presence of an electric current.

What I claim as my invention, and desire to secure by Letters Patent, is—

1. The process of vulcanizing rubber which consists in cooking the same in an air-tight vessel and conveying to said rubber an electric current.

2. The process of vulcanizing rubber by placing the same in a closed vessel having water in the bottom thereof, heating the water to a vulcanizing temperature and conveying to said rubber an electric current.

3. The process of vulcanizing rubber which consists in cooking the same in an air-tight vessel at a high temperature and conveying to said rubber during said cooking an electric current.

In testimony whereof I have affixed my signature, in presence of two witnesses, this 28th day of November, 1902.

WALTER H. ROBERTS.

In presence of—
 NATHAN CLIFFORD,
 ELGIN C. VERRILL.